United States Patent [19]

Feggeler

[11] Patent Number: 4,754,481
[45] Date of Patent: Jun. 28, 1988

[54] EXPANDED PARTIAL RESPONSE PROCESSING FOR ANALOG SIGNAL ENCIPHERING AND THE LIKE

[75] Inventor: John C. Feggeler, Holmdel, N.J.

[73] Assignee: American Telephone and Telegraph Company AT&T Bell Laboratories, Murray Hill, N.J.

[21] Appl. No.: 748,192

[22] Filed: Jun. 24, 1985

[51] Int. Cl.$^4$ .............................................. H04L 9/00
[52] U.S. Cl. .......................................... 380/41; 380/6
[58] Field of Search .............. 179/1.5 R, 1.5 M, 1.5 S; 375/18, 17, 101, 99, 27, 28; 380/6, 9, 8, 41; 340/347 AD

[56] References Cited

U.S. PATENT DOCUMENTS

| | | | |
|---|---|---|---|
| 4,048,572 | 9/1977 | Dogliotti et al. | 455/204 |
| 4,055,727 | 10/1977 | Katoh | 375/101 |
| 4,123,710 | 10/1978 | Stuart et al. | 375/18 |
| 4,283,602 | 8/1981 | Adams et al. | 179/1.5 R |
| 4,398,062 | 8/1983 | McRae et al. | 179/1.5 R |

OTHER PUBLICATIONS

"Secure Voice-Bandwidth Modem", 1982 *Carnahan Conference on Security Technology*, R. J. Cosentino, 5/12/82, pp. 1-14.
"Sampling-Based Techniques For Voice Scrambling," *ICC '80 Conference Record*, S. B. Weinstein, 1980, vol. 1, pp. 16.2.1–16.2.6.
"An Effecient Technique for Sample-Masked Voice Transmission," *IEEE Journal on Selected Areas in Communications*, R. J. Cosentino, May 1984, vol. SAC-2, No. 3, pp. 426–433.
"Correlative (Partial Response) Techniques and Applications to Digital Radio Systems," *Digital Communications: Microwave Applications*, Chapter 7, K. Feher, pp. 144–182.

*Primary Examiner*—Salvatore Cangialosi
*Assistant Examiner*—Aaron J. Lewis
*Attorney, Agent, or Firm*—Jack S. Cubert

[57] ABSTRACT

Partial response signal processing is applied to samples of an analog signal quantized in an amplitude range having a sufficient number of levels that a sample amplitude error of a small percentage of the total levels of the range is not readily perceptible to the human auditory function and that it exhibits tolerable quantizing noise. Samples received into the processing in a transmitting station are sample masked for privacy enciphering. Complementary processing is employed for a receiving station.

2 Claims, 4 Drawing Sheets

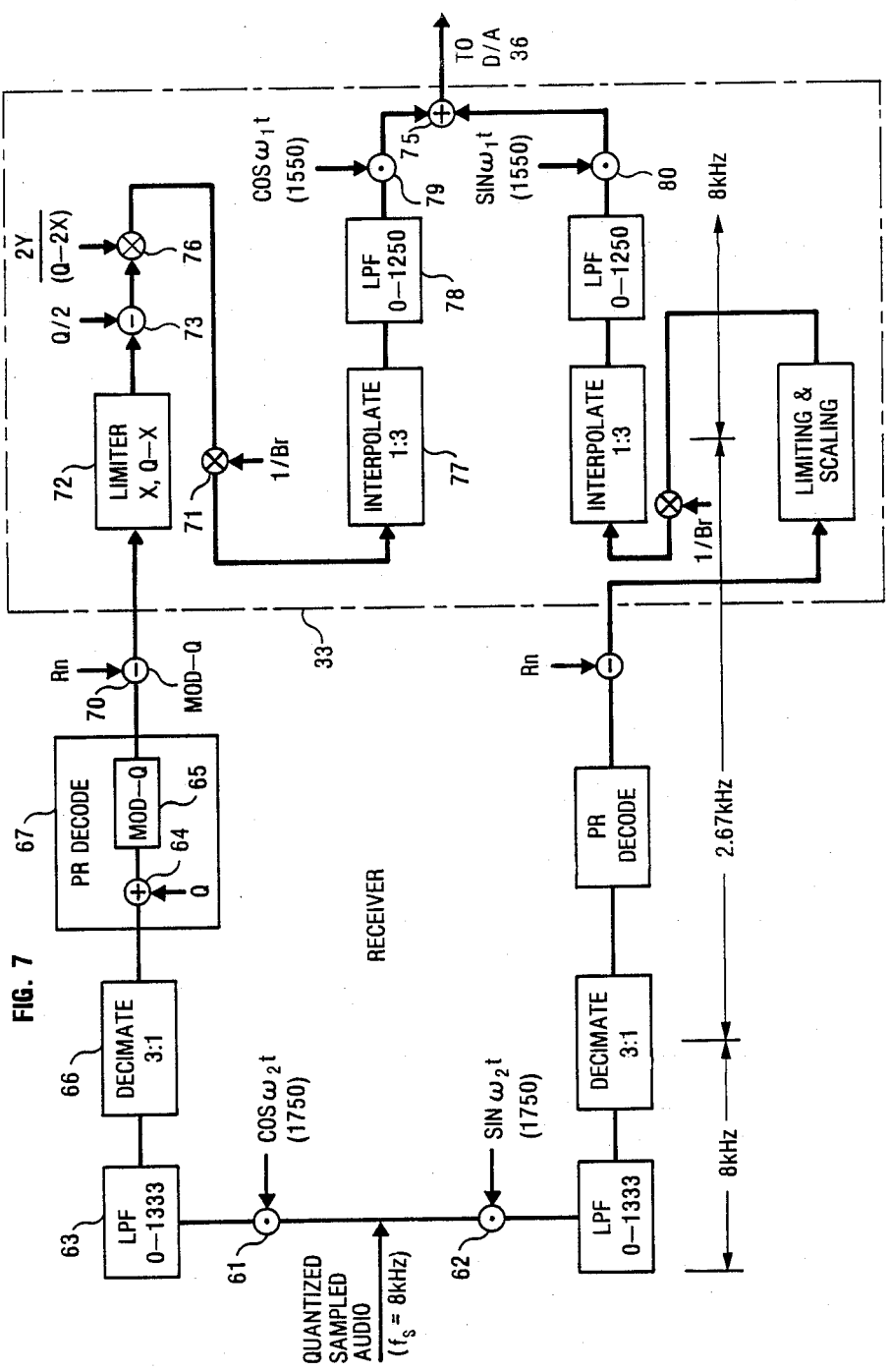

EXPANDED PARTIAL RESPONSE PROCESSING FOR ANALOG SIGNAL ENCIPHERING AND THE LIKE

FIELD OF THE INVENTION

This invention relates to analog signal processing techniques for enhancing the quality of signals transmitted through limited bandwidth channels. More particularly the invention relates to expanded partial response processing of analog signals.

BACKGROUND OF THE INVENTION

Signal communication privacy is a matter of concern in radiotelephone systems. Implementation of privacy techniques involving enciphering of signals and the processing of signals to place them within the transmission bandwidth of a determined transmission medium, such as a telephone system voice channel, usually are accompanied by signal bandwidth expansion. The inconsistent requirements of enlarged bandwidth due to signal processing and/or enciphering and limited bandwidth of a transmission channel can result in reduced quality of transmitted signals. In radiotelephone systems, the need for private transmission is particularly acute, and the bandwidth conflict is significant because the radio link in a communication path of such a system is frequently in series with a relatively narrow band channel of a wire circuit in the public switched telephone network.

Sample masking is one signal enciphering technique that is experiencing growing popularity because the enciphered signals lack remanent clear information energy and so are unintelligible. In sample masking, signal samples are combined by modulo arithmetic with a sequence of signals representing randomly, and with substantially equal probability, the discrete levels of an amplitude range in which the signal samples are quantized. However, the outlined enciphering process expands the bandwidth, as noted above, of a voice signal of reasonable quality beyond the bandwidth of a typical telephone channel. Attempts to meet that challenge at a given effective bit rate have resulted in arrangements that either tolerate substantial reduction in the quality of a transmitted signal, or require special transmission channels of adequate bandwidth, or are so expensive to implement that they are not practical for commercial purposes.

S. B. Weinstein teaches a sample masking system in a paper "Sampling-based Techniques for Voice Scrambling," *ICC '80 Conference Record*, Vol. 1, pages 16.2.1–16.2.6. Input voice samples are constrained to an amplitude range which is reduced at each extreme by an amount corresponding to two or three standard deviations of the ambient noise to make the noise in recovered speech the same as if no scrambling had been performed. Those same input signals are also band limited to a 2500 Hertz bandwidth so that, after the enciphering bandwidth expansion, the signals will have a bandwidth of about 2933 Hertz that approximately matches that of the channel to be used.

An R. T. Adams et al. U.S. Pat. No. 4,283,602 teaches a baseband transmission system of the sample masking type in which enciphered signals are low pass filtered to the same bandwidth as both the original input signals and the transmission medium which is to receive the enciphered signals. Experience has shown that such arrangements, employing only low pass filtering to a common bandwidth create intolerable intersymbol interference which renders the signal unintelligible.

In U.S. Pat. No. 4,398,062 to D. D. McRae et al. is shown another system of the sample masking type and employing low pass filters in the respective channels of a quadrature modulator to "condition the pulse trains" provided from the output of a circuit that splits the enciphered signal into two half-pulse-rate symbol trains. The nature of the conditioning is not explained.

A paper "An Efficient Technique for Sample-Masked Voice Transmission" by R. J. Cosentino et al. appeared in the *IEEE Journal On Selected Areas in Communications*, Vol SAC-2 No. 3 May 1984 at pages 426–433, and describes the use of linear filtering of an enciphered and sample masked signal to modify the enciphered component without processing the signal component. A so-called spectrum-modifier filter was approximated by truncating a weighted sin x/x filter to a length of 599 which is expensive to implement because of the length of the filter.

Another Cosentino et al. paper "Secure Voice-Bandwidth Modem" was presented at the 1982 Carnahan Conference on Security Technology, Lexington, Ky., May 12, 1982; and describes a modem employing single-channel sample masking with sample rate decimation and interpolation.

In Chapter 7 of *Digital Communications: Microwave Applications*, by K. Feher, Prentice-Hall, Inc., 1981, a paper "Correlative (Partial Response) Techniques and Applications to Digital Radio Systems" by A. Lender, includes discussion of the concept of introducing into a data signal a controlled amount of intersymbol interference so that a somewhat higher symbol rate can be accommodated in a channel of given bandwidth. Both binary and non-binary data signals are considered. Modulo addition precoding is indicated to reduce error propagation. Examples of modulo Q=4 (seven level) multilevel systems are presented. A 31-level system is mentioned but not disclosed. Bit slicing is used for data detection and is contemplated for error detection also. In data transmission systems, the noise effects injected during transmission usually do not exceed the amplitude span between adjacent levels.

SUMMARY OF THE INVENTION

The foregoing problems of conflict between bandwidth expansion in enciphering operations and bandwidth limitations on transmission channels for the enciphered signals are alleviated by applying partial response processing to enciphered analog signal samples. In one embodiment, the analog samples are quantized in a sufficient number of levels to approximate a continuously varying analog signal in which an error of a small percentage of the total number of levels in the allowable analog signal range is not readily perceptible to the human ear.

BRIEF DESCRIPTION OF THE DRAWINGS

A more complete understanding of the invention and various features, objects, and advantages thereof may be obtained from a consideration of the following Detailed Description in connection with the appended claims and the attached Drawings in which:

FIGS. 6 and 7 are further detailed diagrams of the transmitting and receiving terminals, respectively, of the system of FIG. 1.

DETAILED DESCRIPTION

Figure 1:
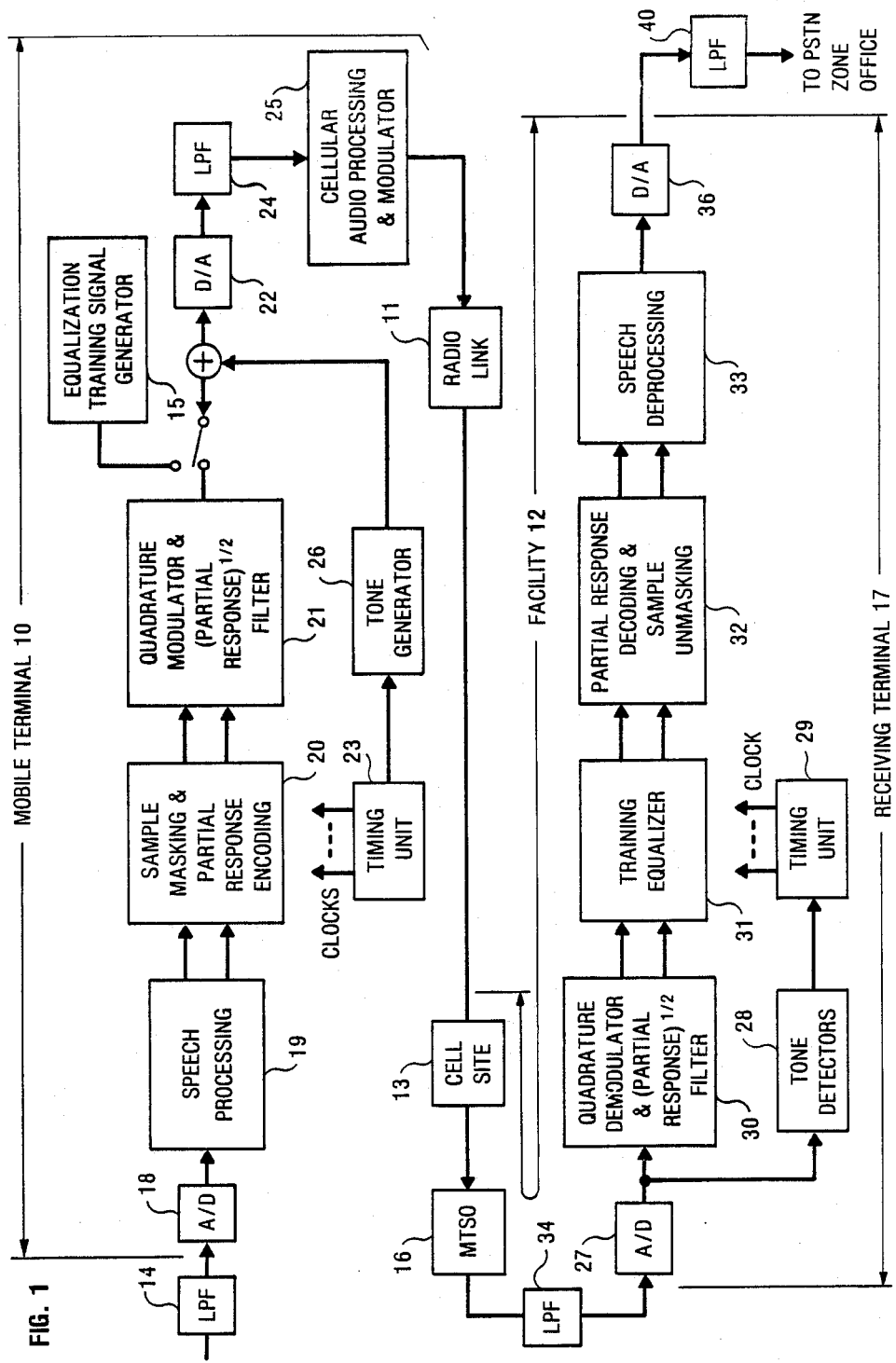
FIG. 1 is a simplified block and line diagram of a communication system employing the invention.

In FIG. 1, the invention is shown as applied to one direction of transmission for a communication path in, e.g., a cellular radiotelephone system. A path for the other direction would be essentially the same. One example of systems of the type in which the invention is illustratively useful is described at length in a collection of papers in the January 1979 *Bell System Technical Journal*. Accordingly, there are omitted from the drawings herein some details of the system which are not necessary for an understanding of the invention.

The path illustrated in FIG. 1 includes a mobile facility, or terminal, 10, such as a vehicular unit which transports radio terminal equipment about the cells of the system service area. Terminal 10 is coupled through a radio link 11 to a fixed facility 12 which is in turn advantageously coupled to a zone office (not shown) of the public switched telephone network (PSTN). Fixed facility 12 advantageously includes a cell antenna site 13 with associated channel radio equipment and controls therefor, a mobile telecommunications switching office (MTSO) 16 and a signal processing facility receiving terminal 17 corresponding to the mobile terminal 10.

In the mobile terminal 10 and fixed receiving terminal 17, various functions are performed; and they can be executed in either analog or digital implementations using individual function techniques already known in the art. For example, in one application, they were implemented using multiple digital signal processors and processor functions of the type shown in the September 1981 issue of *The Bell System Technical Journal*, which issue was subtitled "Digital Signal Processor—A Programmable Integrated Circuit For Signal Processing." Another suitable circuit of the type is the TMS-320 signal processor manufactured by Texas Instruments Incorporated.

Analog speech signals are coupled through an antialiasing filter 14 which limits those signals to about a 300–3000 Hz band. An analog-to-digital converter 18 receives the filtered signals and schematically represents the establishment of an amplitude quantization range for the analog signal information. That range advantageously has a sufficient number Q of levels to represent speech signal variations with quantizing noise that is low enough to be of no significant annoyance to parties communicating over the illustrated path. In a quantizing domain with that many levels, the step size between levels is usually sufficient in relation to the magnitude of noise injected in a signal during transmission between terminals 10 and 17 that the noise can cause level errors of plural levels n; but n is such a small percent of the total number Q of levels that the error occurrence is not readily perceived by the typical human hearing function, hereinafter characterized simply as the human ear. In other words, the quantizing step size between levels is so related to the extent of noise that might be injected during transmission that transmission-noise-induced errors of a small number, at least one, of levels are in a range that is compatible with the error tolerating characteristic of the human ear. It has been found further that the ear can also tolerate errors of five percent or more in the number of levels in the quantizing range without introducing a significant degradation in perceived speech quality.

In one application of the invention, Q=256 levels were found to satisfy the above requirements. The exact number is not critical. It has been found that 256 levels, which can be represented by 8-bit binary coded digital words, are convenient for digital signal processing, e.g., functions such as limiting, enciphering, and partial response encoding of signals, to achieve an advantageous compromise between maximizing information throughput rate and transmitted signal error rate.

However, it is convenient for other signal processing functions such as scaling, filtering, and modulation to use 16-bit arithmetic to handle arithmetic operation carries and truncate the results to the 8-bit level for the previously indicated functions.

Given such a value, i.e. 256, for Q, it has been further found that each change of one bit in the number of bits used to represent digitally the analog signal amplitudes causes about a six decibel (dB) change in quantizing noise—fewer bits meaning more noise and vice versa. It has been found that a quantizing range of 64 levels (represented by 6 bits) is about as small as can be employed and still generally get user reactions of at least good signal quality. In a number of instances, signals were quantized and digitally represented in a quantizing domain of many more levels than 256; but only the 256 levels (the 8 most significant bits of the digital representations) were used for certain of the illustrated functions, as previously noted, as an advantageous compromise between a desire for low quantizing noise and a need for a practical word bit length for those digital signal processing functions.

Output of converter 18 is applied to a preliminary speech processing function block 19 which provides functions such as limiting, scaling, splitting, filtering, and decimating. These will be described in more detail in connection with FIG. 6, and they are provided for protection against noise for certain modulo arithmetic functions to be described and for developing in-phase and quadrature-phase versions of the signal to facilitate the filtering and other functions to be described. The resulting in-phase and quadrature versions of digitally represented analog sample amplitudes are applied through a sample masking and partial response encoding function block 20. Each of the masking and encoding functions involves a different modulo arithmetic operation. Yet another function block 21 provides one part, i.e. the square root, of a partial response filter function and a quadrature modulation function to translate the processed baseband in-phase and quadrature signals up to a suitable passband range, e.g., 300–3000 Hz, Which is characteristic of many circuits in the PSTN. The digitally represented masked sample amplitudes are thereafter converted to analog form by a digital-to-analog converter 22.

As will be further described subsequently, at least the sample masking and the partial response functions take place in the same signal amplitude domain, that is, in the same signal quantizing range or at least in different compatible ranges. Compatible domains, or ranges, are those in which the respective quantizing ranges each meets the foregoing specifications, as to low quantizing noise and as to compatibility with the error tolerating capability of the human ear, and signals can be translated between them by appropriate scaling.

In addition, the cumulative partial response filtering (product of the square roots of transmit and receive parts of the filtering) is of the type which injects a predetermined controlled amount of intersymbol interference. Such filtering has heretofore been employed only for data transmission systems as to data symbols of a relatively few number of levels. Usually that number is at least an order of magnitude less than the number of levels that are needed for adequate representation of speech signal samples as above outlined. Also the step size with that smaller number of levels is usually so large that noise is unlikely to cause errors of even one level. More importantly, however, the intersymbol interference contemplated in those data systems is between data symbols whereas it is here contemplated in a sense which might be characterized as "intersample interference" where each sample is an analog value that is digitally represented, in the partial response filtering operation, by a plurality of discrete data symbols for convenience of processing. In other words, the transfer function of the partial response filtering function is determined largely by a frequency parameter represented by the frequency of occurrence of analog sample values which have a discrete representation.

Figure 2:
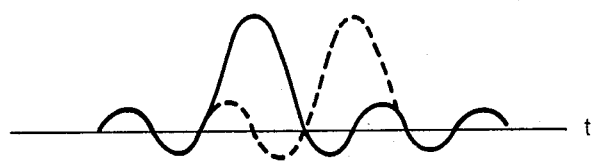
FIGS. 2–5 are diagrams illustrating operation and advantages of the invention.

In the FIG. 2 amplitude versus time diagram are shown analog wave representations of two time-adjacent impulses, such as data bits in a data system or speech samples in a voice system. These impulses are of the type that may have appeared at the input of the converter 22 in FIG. 1 if conventional Nyquist type filtering had been employed instead of the indicated partial response filtering. In FIG. 2, the solid line wave is the current impulse and the dashed wave is the one that preceded it in point of time. This type of filtering is designed theoretically to shape the impulses so that they each exhibit maximum amplitude in the center of a bit time and low amplitude so-called sidelobes on either time side which have zero crossings at the center points of adjacent bit intervals. That approach is taken to minimize intersymbol interference; but, as noted in the aforementioned Lender paper, the theoretical result is physically unrealizable. Consequently, practical applications have typically reduced the data transmission bit rate to achieve a reasonably low error rate.

Figure 3:
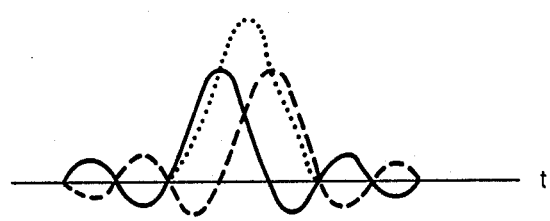

In the FIG. 3 amplitude versus time diagram are shown analog wave representations of two time-adjacent samples such as are applied to the input of the converter 22 in FIG. 1 when partial response filtering is employed. The solid line wave is the current one, and the dashed wave is the one that preceded it in point of time. The dotted wave is the sum of the current and prior waves and represents the type of waveshape that would be recovered at the output of block 30 (to be described) in fixed facility 12. It can be seen from that figure that the central, or main lobe, portions of the current and preceding impulses overlap by a known amount that is fixed for partial response functions by choosing partial response filtering passband in relation to the signal symbol rate (sample rate in the case of FIG. 1). Consequently, the partial response processing introduces a known and controlled amount of intersymbol interference (ISI); and, because it is known, it can be conveniently removed at a receiving terminal. Since the ISI is removable, it is not necessary to reduce the transmission rate of impulses. It will be hereinafter shown that this controlled ISI feature, which has been known for use in data bit impulse transmission systems is, when appropriately applied, also advantageously useful in connection with speech sample impulses.

Figure 4:
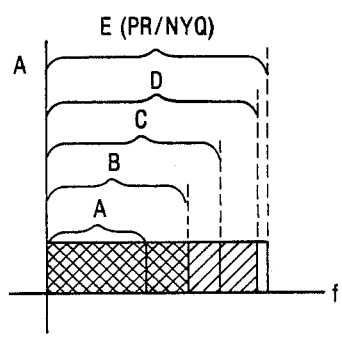

FIG. 4 depicts a set of superimposed signal frequency bandwidth diagrams to illustrate the advantage of partial response processing in a bandwidth sense as newly applied to the speech transmission problem. For the purpose of these diagrams, any arbitrarily given uniform amplitude in a passband, impulse transmission rate, impulse error rate, and transmission channel bandwidth are assumed. It is also assumed that, in the illustrative application to sample masking, the baseband input signals before sample masking are band limited to a band such that after any intervening processing the resulting signal produced by digital-to-analog converter 22 will have a bandwidth approximately the same as that of the transmission channel, e.g., the allowable bandwidth of the wire and radio channel including radio link 11.

The portion of the FIG. 4 diagram indicated by the bracket A represents a maximum limited band that must be imposed on input signals to prior systems employing Nyquist type filtering of the sample masked impulses that are to be applied to the radio link 11. The wider bandwidth portion indicated by the bracket B represents the wider limited band that must be imposed on input signals to systems of the type in FIG. 1 and employing partial response type filtering of the sample masked impulses to be applied to the same radio link 11. Portions A and B are typically passband signals here assumed to have a common lowest frequency such as 300 Hz. Portions A and B are double crosshatched to distinguish visually the premasking part of the diagram from the remainder.

FIG. 4 portions indicated by brackets C and D represent the proportionately similar bandwidth expansion that normally results from sample masking for the input signals represented by portions A and B, respectively. Parts of C and D extending beyond the upper frequency end of B are single cross hatched. Finally, the FIG. 4 portion indicated by bracket E represents the ultimate bandwidth achieved for application of both the Nyquist and the Partial Response filtered signals to the common channel 11; and the part of E extending beyond D is uncrosshatched. It should be understood that although for convenience the portion E has been shown as having the same lowest frequency as the portions A through D, E is typically modulated up to be a passband signal of, e.g., 300–3000 Hz, for either A or B input in order to match typical telephone channel bandwidths in the PSTN.

It should be apparent from the foregoing that the bandwidth expansion associated necessarily with the Nyquist filtered signal, i.e., from the upper frequency of C to the upper frequency of E, is much greater than the expansion associated with the partial response filtered signal, i.e., from the upper frequency of D to the upper frequency of E. It can be seen in FIG. 4 that the D and E bandwidths are approximately the same. Consequently, given a system with a transmission channel bandwidth corresponding to E of FIG. 4, a system employing the heretofore typical Nyquist filtering must start with a band limited input signal of significantly narrower bandwidth, than is the case for a system using partial response filtering, in order to allow for the bandwidth expansions of both the sample masking operation and that of the Nyquist filtering to be done. It has been found that this difference in starting bandwidth is the margin between a receiving terminal signal that has sufficient bandwidth to represent an adequate frequency range of both male and female voices to be easy to listen to for extended periods and a receiving terminal signal that has insufficient bandwidth to represent those same voices without significant distortion, which renders the signals hard to listen to without undue fatigue for extended periods of time.

Figure 5:
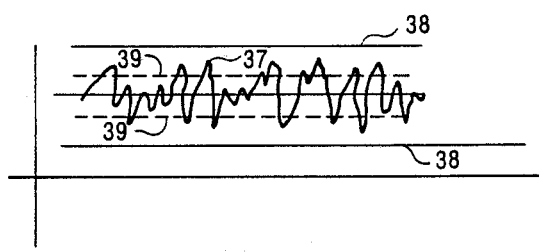

FIG. 5 illustrates the discovery that the relation between quantizing step size and transmission noise required for data transmission is not necessary for analog speech sample transmission because of the aforementioned quantizing level detection error tolerance capability of the human hearing function, i.e., the so-called human ear. In FIG. 5, there is shown a randomly varying analog signal wave segment 37 representing transmission noise typically injected into a transmitted signal during transmission through a medium such as the FIG. 1 radio link 11. A pair of solid horizontal lines 38 represent a minimum binary coded data signal quantizing step size required to enable transmitted signal reception with a reasonably low error rate. By contrast, the dashed lines 39 represent a minimum, though not critical, analog speech sample signal quantizing step size for enabling transmitted signal reception for good quality speech recovery. Thus, quantizing step size for speech can be made small enough to reduce quantizing noise to reasonable levels with sufficient resolution for good speech reproduction even though that small step size is much less than the expected transmission noise amplitude. That is, the human ear does not readily perceive level errors such as can be produced by noise of the indicated relative magnitude.

Returning to FIG. 1, an equalization training signal generator 15 provides a signal for training an equalization function in terminal 17. Output of generator 15 is switchably substituted for output of block 21 at appropriate times in the course of system operation, as is well known.

A timing unit 23 in FIG. 1 produces various clock signals employed for the function blocks in the remainder of the terminal 10. In addition the unit provides clock to a generator 26 of tones for, e.g., pilot tones employed in a single sideband system of the sort contemplated in connection with the single sideband receiver of the U.S. Pat. No. 4,403,348 of K. W. Leland and N. R. Sollenberger. Such tones can also be utilized for enciphering function countdown handshake between terminals and for other synchronizing functions, as is known in the art. The output of generator 26 is, in a digitally implemented embodiment, injected into the signal path, e.g., by arithmetic adding of time coincident sample values, at the input to converter 22. This location is employed because the tones are advantageously generated digitally, e.g., by known digital signal processing operations; and the resulting tone sample values can be here injected by adding digitally represented sample amplitudes. The resulting digitally represented speech and tone sample sums are converted to analog by converter 22 and applied via a sample smoothing filter 24 and appropriate transmitter radio frequency circuits, i.e. cellular audio processing and modulation circuit 25, to the radio link 11.

Radio signals received at the cell site 13 are restored to their passband position, e.g., 300–3000 Hz. Those signals are then passed on a voice signal trunk used for the particular radio channel employed to the MTSO 16 where they are switched to a wire path, including terminal 17 for recovery of clear speech signals to be forwarded to the PSTN zone office. Terminal 17 is advantageously located on the zone office side of the MTSO so one need not deal with enciphering key changes when performing handoff.

It can be seen from FIG. 1 that the receiving terminal 17 functions are in many respects essentially the inverse of those in the mobile terminal 10. Received analog samples are coupled through an anti-aliasing filter 34 and again converted to digital format by an analog-to-digital converter 27. Tone samples are extracted for detection by digital filtering functions in tone detectors 28. Output of those detectors is applied to a timing unit 29 which produces the various clock signals required for the functions of terminal 17. Output of converter 27 is also applied to a quadrature demodulator function block 30, which develops in-phase and quadrature phase versions of the signal samples, applies the remaining square root portion of the partial response filtering, and performs decimation prior to application of the signals to an equalizer function block 31. That block is operative for equalization training at appropriate times in system operation, e.g., when the terminal is started up for the incoming message. Otherwise, block 31 equalizes signals which are passed on to a partial response decoding and sample unmasking function block 32.

It is advantageous in some applications, as here, to split the partial response filtering function between two square root portions in terminal 10 block 21 and terminal 17 block 30. However, that filtering function can be split in other ways which are well known in the art.

Equalized outputs of block 31 are in block 32 unmasked by subtraction of the pseudorandom sample sequence used at terminal 10 and partial response decoded, both being modulo-Q operations. The deciphered speech samples are passed on to a speech deprocessing function block 33 where limiting, inverse scaling, interpolation, and filtering take place. Finally, the clear speech samples in digital form are restored to analog form by another digital-to-analog converter 36 prior to being coupled through a filter 40 for transmission to the local zone office in the public switched telephone networks (PSTN). Filter 40 is a low pass filter with cutoff frequency between the upper edge of the voice band and the sample rate for integrating the samples to restore the speech signal information.

It has been found that the outlined technique for sample masking and partial response processing of analog sample amplitude values allows use of the desired speech bandwidth and results in relatively minor user-perceived reduction in signal quality, in the range of 0–3 dB, compared to the signal quality of a standard cellular radiotelephone channel.

Figure 6:
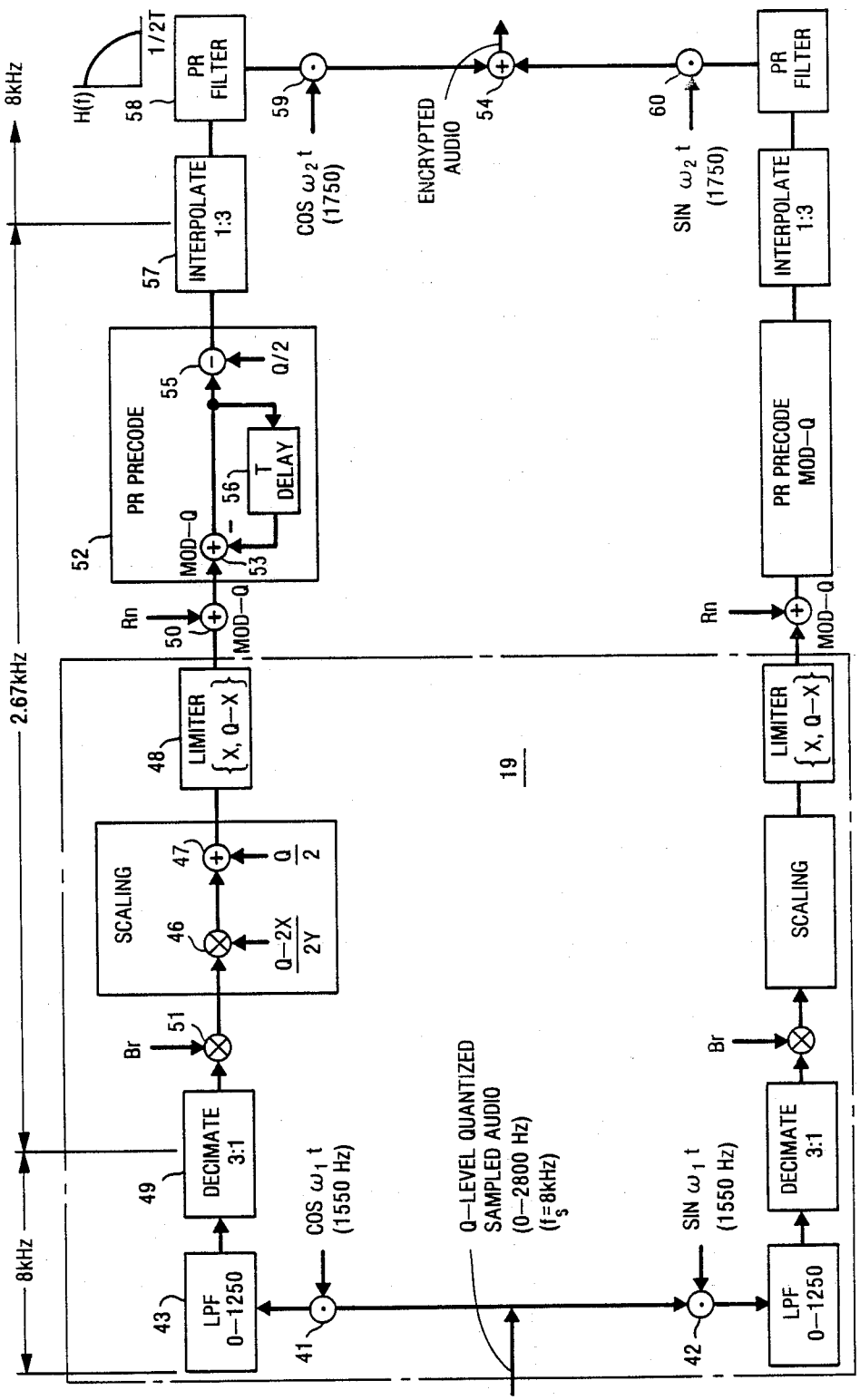

FIG. 6 shows additional detail of the operations of the various functional blocks in the transmitter terminal 10 depicted in FIG. 1. Both analog and digital techniques are known in the art for implementing each of the circuit blocks shown in FIG. 6 in isolation, and such block details comprise no part of the present invention. The input to the speech processing function 19 in FIG. 6 is the digital form of analog speech samples provided from converter 18 in FIG. 1. Signal energy in the 300–2800 Hz baseband, corresponding to the band B in FIG. 4, is presented illustratively in an 8 kiloHertz, Q-level quantized sample stream. The sample amplitudes are in a range $\pm y$ volts. Signal energy is split into two paths in which it is applied to modulators 41 and 42 for multiplying with $\sin \omega_1 t$ and $\cos \omega_1 t$ signals, illustratively at 1550 Hz, to create the usual in-phase and quadrature-phase signals for convenience of further processing. Local oscillation sources for the modulators 41 and 42, and for other modulators and pulse sources to be mentioned, are advantageously a common oscillator in timing unit 23, with outputs properly phased, to assure coordinated operation of such sources within the transmitter. Operation of that oscillator is further coordinated with corresponding circuit elements in the receiving terminal by virtue of transmission of outputs of tone generator 26, as previously mentioned. Since further processing in these two in-phase and quadrature-phase paths is identical up to the point of later quadrature modulation to place the signals in a proper passband, only one path will be described.

Output products from modulator 41 are low pass filtered in a filter 43 to confine further processing to the baseband product in the illustrative band 0–1250 Hz.

From a Nyquist sampling standpoint, a minimum sampling rate of 2500 Hz is required. Accordingly, the output of filter 43 is applied to a decimating function circuit 49 wherein only every third sample in the normal signal sequence is selected for use in the processing operations which follow. Decimating the 8 kHz sampled signal by three is easy to do and yields a 2667 Hz sampling rate. That new low rate also reduces the complexity of the digital signal processing to follow, and it makes the subsequent problem of transmitting masked sample information over a channel of limited bandwidth tractable.

Output of decimating circuit 49 is applied through a multiplier 51, to be described, to one input of an amplitude scaling multiplier 46 which brings the received sampled signals into a range for efficient use of the available part of the quantizing range. The received sample amplitude digital representations have already been quantized in a range of 0–255 levels, i.e., Q=256, wherein each level number is the number of a voltage at the lowest voltage of a step of uniform size throughout the range. It is assumed that the maximum anticipated normal signal excursion substantially fills the level range. Modulo arithmetic operations are to be performed in the signal processing path as has been mentioned; and it is assumed illustratively that they are all in the same amplitude domain of 256 levels of the same step size.

It is permissible for normal signal processing operations, e.g., addition and subtraction, to cause modulo wrap-around because it is well known that a modulo subtractor following a modulo adder automatically provides compensating "unwrapping" in the receiving terminal. However, it is not good if transmission noise injected between terminals should cause wrap-around because that would cause large errors in the speech signal restoration result. For example, a 2-level transmission noise added to a 255-level speech sample equals a 1-level, modulo-256, result; and the receiving terminal operations will perceive it as a small signal instead of a large one because no inverse function is in the receiver terminal to take the transmission noise out. Thus, a small amount of transmission noise can create a large error in the recovered waveform. Therefore, output signals from the decimating circuit 49 are scaled so their maximum excursion fills a range less than that of the full Q=256 levels.

To that end, the total range of levels is reduced by some number, X, of levels at each of the low and high ends of the range to leave an effective signal range of Q−2X levels. For example, if transmission noise is expected normally to be a maximum of 10 levels, X is chosen to be about 28 levels to be sure that no noise-induced wrap-around can occur. Multiplier 46 performs the necessary scaling to bring the ±y volt signal range into the Q−2X level range and receives both the output of multiplier 51 and a multiplier factor (Q−2X)/2Y.

An adder 47 biases the scaled bipolar signals by Q/2 levels to shift the center of the signal range to the center of the Q=256 level range in order to facilitate modulo arithmetic. The centered signals are then amplitude limited to the range from X to Q−X levels in a limiter 48 to remove any extraordinary excursions that may have been present in the quantized received signals and persisted through the mentioned scaling and level shifting functions.

Output from the limiting circuit 48 in the speech processing function 19 is applied to one input of an adder 50 for sample masking the speech samples. Adder 50 is operated for modulo operation, as is known in the art for sample masking, and here the operation is modulo Q. To each successive signal sample Sn is added a random number Rn drawn from an enciphering sequence having values which are mutually independent and uniformly distributed over the desired coding interval Q, i.e., illustratively the same amplitude domain as that of the samples being masked. The sum An is taken modulo-Q so that $An = Sn + Rn \ (Mod\text{-}Q)$.

The result An of this process is a sequence of random variables, the elements of which are uniformly distributed over the range Q, provided Q>Maximum Magnitude of Sn, and have amplitudes statistically independent of all other element values. Forming the enciphered sequences in the foregoing manner from the sampled version of the signal permits a secure waveform to be produced for transmission. The random number sequence used in the masking process is advantageously derived through use of the well known DES algorithm approved by the National Bureau of Standards. Although the same symbol Rn is employed for the random sequences of both the in-phase and quadrature-phase branches in FIG. 6, the sequences used in the two branches are advantageously different, mutually independent sequences. The same is true of the sequences Rn in the receiver of FIG. 7.

An interesting property of sample masking is that when low level unenciphered speech signals, e.g., from cross talk originating in the PSTN, are superimposed on enciphered speech signals in the receiving terminal, the low level speech will appear after deciphering as intelligible cross talk superimposed on the desired deciphered component. Cross talk of this nature will tend to give the false impression to the user of the enciphered channel that the channel is not secure. In applications where such crosstalk is a problem, this residual intelligibility of crosstalk is advantageously eliminated by multiplying speech signal samples prior to sample masking by a pseudorandom sequence Br of positive and negative unity gain functions in the multiplier 51. These effects are removed in the receiver after the deciphering process. Since the unenciphered crosstalk will not contain this pseudorandom multiplication, the removal of these factors from the desired signal in the receiver will also apply them to the crosstalk. This operation will render the crosstalk unintelligible.

The masked samples are next applied to a partial response precoding circuit 52. There the samples are coupled through another modulo-Q adder wherein there is subtracted an impulse from the most recent prior sample time as represented by the T-delay circuit 56 coupled between the output and second input of adder 53. T is the duration of a sample interval in the decimated sample sequence and is the reciprocal of the decimated sequence sample rate. It is, however, emphasized here that this precoding operation operates, as indicated by the T-delay, on the basis of the decimated sequence sample interval or rate rather than on the bit interval of the digital data bits used to represent the sample magnitude in the illustrative digital processing implementation of the sample masking, partial response, and associated signal processing. The indicated precoding operation permits independent interpretation of each sample amplitude at the receiving terminal 17 in spite of the correlation properties between successive samples, which will be incorporated in the partial response filtering to be mentioned. Consequently, there can be no propagation of errors. A subtractor 55 subtracts a value corresponding to Q/2 levels from the output of adder 53 to remove the offset imposed by adder 47 and restore the bipolar characteristic of the signal.

Output from adder 55 is also applied to an interpolating circuit 57 wherein each masked and precoded sample is interleaved with two zero-amplitude samples to accomplish a one-to-three interpolation, the inverse of the decimation in circuit 49, and thereby restore the sample rate to that at the input of speech processing circuit 19. The interpolated sample sequence is then coupled through a square root partial response filter 58 to an input of a modulator 59. Filter 58 has a square root of cosine type of amplitude characteristic as indicated by the small diagram of its frequency response, or transfer function, in FIG. 6. The filter has a cutoff frequency substantially less than the sample rate in the precoding circuit 52. Illustratively, that cutoff is at half of the decimated sample recurrence frequency, i.e. illustratively 1333 Hz, as indicated by $\frac{1}{2}T$ in the diagram, where T is the period of the decimated recurrence frequency, i.e. illustratively 2667 Hz. The result of such filtering is to incorporate a fixed, i.e. controlled, amount of intersymbol interference, again wherein the symbols under consideration are the sample amplitudes rather than the individual bits of a digitally represented value of that amplitude. Filtered signals in the in-phase and quadrature-phase paths of terminal 10 are applied to an input of each of the modulator 59 and another modulator 60. Those modulators also receive local oscillator signals $\sin \omega_2 t$ and $\cos \omega_2 t$ for shifting the signals in the two paths to the passband position, i.e. 300–3000 Hz, of the channel to be used for transmission. Outputs of the modulators are combined in an adder 54 to form the sample masked analog sample stream for application to the converter 22 in FIG. 1.

In FIG. 7 is shown additional detail for the receiving terminal 17 at a level similar to that of the terminal 10. In FIG. 7 again the in-phase and quadrature-phase paths after demodulation are the same so only one is described. The quantized, sample masked, digitally encoded signals from analog-to-digital converter 27 in FIG. 1 are quadrature demodulated in modulators 61 and 62 in accordance with local oscillator signals at the same frequency, i.e. 1750 Hz, as was employed at modulators 59 and 60 in FIG. 6 mobile terminal 10. The resulting bandpass product at 0–1333 Hz is selected by a square root cosine filter 63 which also completes the intersymbol interference insertion effect of filter 58. Samples in the output of filter 63 have amplitudes in a range $\pm Q$. A three-to-one decimation is performed in a decimating circuit 66 since the full 8 kHz sample rate is not needed for the decoding and unmasking operations to be performed. The training equalizer 31 function of FIG. 1 is not shown in FIG. 7 for clarity. The decimated 2667 Hz sample rate signal is applied to a partial response decoding circuit 67. In an adder 64 the value Q is added to all samples to convert them from a bipolar to a single sided form. In the latter form the signal is taken modulo-Q in circuit 65. This removes the transmitter partial response coding effect as well as the intentionally inserted intersymbol interference and leaves discrete, masked samples.

Masking is removed in a modulo-Q subtractor 70 by subtracting the same pseudorandom pulse sequence Rn used in terminal 10. In the speech deprocessing circuit 33, the clear samples are limited (after both modulo-Q arithmetic operations) by a limiter 72 to the same {X, Q-X} range employed in limiter 48, restored to their normal ground reference by subtractor 73 removing the Q/2 bias, and scaled back to the originally received sample amplitude range by multiplication in 76 by 2Y/(Q-2X). Likewise, the unmasked samples are, in a multiplier 71, multiplied by the reciprocal pseudorandom, plus and minus, unity gain sequence 1/Br to remove the crosstalk protection effect. An interpolating circuit 77 interleaves each sample with two zero-amplitude samples, in a manner that is the inverse of the decimation in circuit 66, to restore the original 8 kHz sample rate; and a low pass filter 78 limits the band of the 8 kHz samples to the 0–1250 Hz range so that they can be restored to the same band of 300–2800 Hz by use of the same frequency 1550 Hz signals employed in the transmitting terminal 10. That remodulation is performed by modulators 79 and 80, and their outputs are combined by an adder 75 prior to application to input of digital-to-analog converter 36 in FIG. 1.

From the foregoing, it can be seen that use of partial response techniques with respect to speech samples, vis a vis digital bits of a binary coded representation of sample amplitude, has enabled the transmission of speech signals with improved bandwidth by the employment of linear filters, e.g., 43, 58, 63, and 78, and mixers, e.g., 41, 42, 59, 60, 61, 62, 79, and 80 and without specific signal level detection problems.

Although the invention has been described in connection with an illustrative embodiment thereof, it is to be understood that other embodiments, modifications, and applications thereof which will be apparent to those skilled in the art are included within the spirit and scope of the invention.

What is claimed is:

1. In a communication system having channels with a prescribed bandpass B,
   a transmitting terminal comprising
   means for receiving analog speech signal samples for transmission in a channel subject to transmission noise of up to a predetermined amplitude x,
   means for quantizing the speech signal samples in a prescribed amplitude range to a set of $Q >= 64$ quantizing levels sufficient to substantially approximate a continuously varying speech signal in which the span between each adjacent pair of levels is less than said predetermined transmission noise amplitude,
   means for limiting the range of quantizing levels of said speech signal samples over said prescribed amplitude range to be less than Q-x, means for sample masking said limited range speech signal samples to form encrypted speech signal samples having a bandwidth > B means for partial response processing said encrypted limited range speech signal samples to reduce the bandwidth of the encrypted speech signal samples to less than B, means for passing said partial response processed encrypted limited range speech signal samples through a low pass filter having a square root cosine response characteristic with a cutoff frequency less than B and means for producing an analog signal responsive to said low pass filtered encrypted limited range speech signal samples.

2. The communication system in accordance with claim 1 further comprising a receiving terminal coupled to receive said analog filtered encrypted speech signals from said transmitting terminal including means for forming encrypted speech signal samples from said received filtered encrypted speech signal, and means for processing said encrypted voice signal samples received from said transmitting terminal to remove the effect of said transmitting terminal partial response processing, said processing means comprising decoding means and means for limiting the sample amplitudes from said decoding means to a predetermined intermediate portion of the amplitude range to prevent transmission-noise-induced wrap-around.

* * * * *